(12) United States Patent
Sakanoue et al.

(10) Patent No.: US 10,343,549 B2
(45) Date of Patent: Jul. 9, 2019

(54) RAILWAY VEHICLE

(71) Applicant: CENTRAL JAPAN RAILWAY COMPANY, Aichi (JP)

(72) Inventors: Kei Sakanoue, Aichi (JP); Masashi Furuya, Aichi (JP); Hirokazu Kato, Aichi (JP); Shigekazu Okada, Aichi (JP)

(73) Assignee: CENTRAL JAPAN RAILWAY COMPANY, Aichi (JP)

( * ) Notice: Subject to any disclaimer, the term of this patent is extended or adjusted under 35 U.S.C. 154(b) by 55 days.

(21) Appl. No.: 15/322,692

(22) PCT Filed: Jul. 1, 2015

(86) PCT No.: PCT/JP2015/069022
§ 371 (c)(1),
(2) Date: Dec. 28, 2016

(87) PCT Pub. No.: WO2016/002849
PCT Pub. Date: Jan. 7, 2016

(65) Prior Publication Data
US 2017/0129362 A1 May 11, 2017

(30) Foreign Application Priority Data
Jul. 1, 2014 (JP) .................................. 2014-135888

(51) Int. Cl.
*B60L 3/00* (2019.01)
*B60L 15/00* (2006.01)

(52) U.S. Cl.
CPC ............... *B60L 15/002* (2013.01); *B60L 3/00* (2013.01); *B60L 3/0069* (2013.01); *B60L 2200/26* (2013.01)

(58) Field of Classification Search
CPC .. B60L 15/002; B60L 2200/26; B60L 3/0069; B60L 3/00; B60L 3/04
See application file for complete search history.

(56) References Cited

U.S. PATENT DOCUMENTS

| | | | |
|---|---|---|---|
| 2,262,413 A * | 11/1941 | Whittaker | B60L 5/32 191/8 |
| 6,707,171 B1 * | 3/2004 | Huenner | B60L 3/00 307/113 |

(Continued)

FOREIGN PATENT DOCUMENTS

| | | |
|---|---|---|
| JP | 56123701 | 9/1981 |
| JP | 862264 | 3/1996 |

(Continued)

OTHER PUBLICATIONS

International Preliminary Report and Written Opinion from corresponding PCT application No. PCT/JP2015/069022. dated Jan. 12, 2017.

(Continued)

*Primary Examiner* — Mark T Le
(74) *Attorney, Agent, or Firm* — Ferguson Case Orr Paterson

(57) ABSTRACT

A railway vehicle having a plurality of electrical circuits is presented herein. The railway vehicle comprises an external power supply connection portion; a contactor of a normally closed type that opens and closes a common line connecting the plurality of electrical circuits to a ground, the contactor opening the common line by receiving supply of electric power through the external power supply connection portion and closing the common line when no current is applied; and an operation prohibition determining unit that determines whether supply of electric power to the plurality of electrical circuits is stopped and that prohibits the contactor from (Continued)

opening the common line when the supply of electric power is not stopped.

4 Claims, 3 Drawing Sheets

(56) References Cited

U.S. PATENT DOCUMENTS

| | | | | |
|---|---|---|---|---|
| 8,467,161 | B2* | 6/2013 | Hofmann | B60L 3/003 |
| | | | | 361/42 |
| 9,849,787 | B2* | 12/2017 | Cypers | B60L 3/0069 |
| 2001/0003500 | A1* | 6/2001 | Cheze | B60L 3/00 |
| | | | | 361/93.1 |
| 2007/0188948 | A1* | 8/2007 | Morita | B60L 3/0046 |
| | | | | 361/42 |
| 2010/0079093 | A1* | 4/2010 | Kitanaka | B60L 3/003 |
| | | | | 318/400.3 |
| 2016/0236590 | A1* | 8/2016 | Buehs | B60L 3/0069 |

FOREIGN PATENT DOCUMENTS

| | | |
|---|---|---|
| JP | 11235039 | 8/1999 |
| JP | 2006320073 | 11/2006 |
| JP | 2008149897 | 7/2008 |

OTHER PUBLICATIONS

International Search Report, International application No. PCT/JP2015/069022, dated Sep. 8, 2015.

* cited by examiner

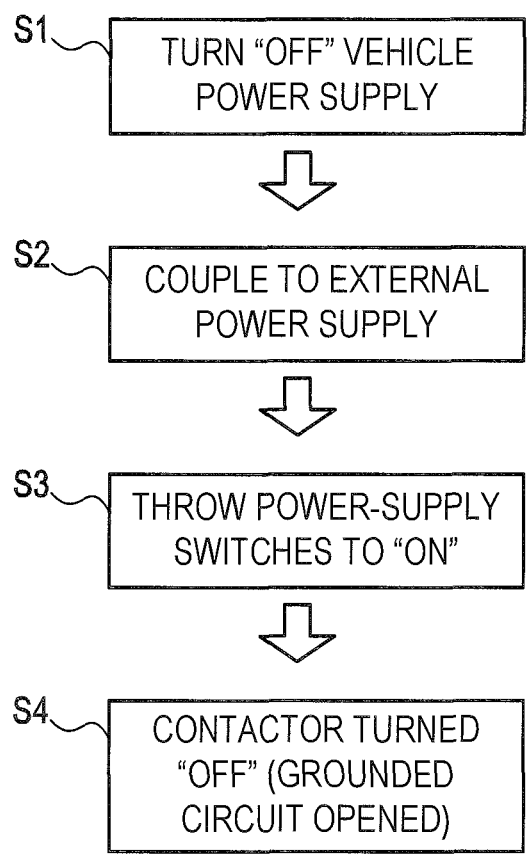

RAILWAY VEHICLE

CROSS-REFERENCE TO RELATED APPLICATIONS

This international application claims the benefit of Japanese Patent Application No. 2014-135888 filed on Jul. 1, 2014 with the Japan Patent Office, and the entire disclosure of Japanese Patent Application No. 2014-135888 is incorporated herein by reference.

TECHNICAL FIELD

The present invention relates to a railway vehicle.

BACKGROUND ART

A railway vehicle is provided with a plurality of electrical circuits. Provided to each electrical circuit, at a ground side thereof, is a ground-side switch that opens and closes a circuit leading from the electrical circuit to a ground.

The railway vehicle provided with the ground-side switch has already been put to practical use; however, such a railway vehicle is not described explicitly in any documents such as patent gazettes. In other words, there is no "information on prior art documents that should be described" in connection with the present invention. Thus, the information on prior art documents is omitted in the present specification.

SUMMARY OF THE INVENTION

Problems to be Solved by the Invention

When performing insulation measurement of each electrical circuit, a user conventionally has to open the ground-side switch provided to each electrical circuit by manual operation. In such a case, it is feared that an operational mistake may be induced, such as (1) performing the insulation measurement with the ground-side switch closed, (2) forgetting an operation of closing the opened ground-side switch after completion of the insulation measurement, and the like.

It is desirable to provide a railway vehicle that enables reduction of occurrence of operational mistakes (human errors).

Means for Solving the Problems

In one aspect of the present invention, a railway vehicle having a plurality of electrical circuits is characterized by comprising: an external power supply connection portion for coupling of an external power supply; a contactor of a normally closed type that opens and closes a common line connecting the plurality of electrical circuits to a ground, the contractor opening the common line by receiving supply of electric power through the external power supply connection portion and closing the common line when no current is applied; and an operation prohibition determining unit that determines whether supply of electric power to the plurality of electrical circuits is stopped and that prohibits the contactor from opening the common line when the supply of electric power is not stopped.

Such a configuration makes it possible to obtain following effects (A) to (D) in one aspect of the present invention.

(A) When the contactor is opened, all of the plurality of electrical circuits go into a state not connected to the ground. Accordingly, it can be inhibited that insulation measurement is performed with the electrical circuits connected to the ground.

(B) The contactor is of a normally closed type. Thus, when the external power supply is detached from the external power supply connection portion, the contactor is closed concurrently. Accordingly, it can be inhibited that the insulation measurement is terminated with all of the plurality of electrical circuits in a state not connected to the ground.

(C) For example, if the contactor is of a normally opened type, when the current supply to the contactor is stopped while the train is running, all of the plurality of electrical circuits go into a state not connected to the ground. In such a case, a malfunction may occur, such as stopping of devices operated by the electrical circuits. In contrast, the contactor according to one aspect of the present invention is of a normally closed type, and thus, occurrence of the malfunction as described above can be inhibited.

(D) When the supply of electric power to the plurality of electrical circuits is not stopped, the contactor is not opened. Thus, the contactor is not required to have a current interruption function. Accordingly, it is unnecessary to use a breaker as the contactor, whereby size reduction of the contactor can be promoted.

An embodiment of the present invention will be described below with reference to the drawings. "The embodiment of the invention" described below illustrates one example of the embodiment. In other words, invention-specifying matters and so on recited in the claims are not limited to specific means, structures, and so on illustrated in the below-described embodiment.

BRIEF DESCRIPTION OF THE DRAWINGS

FIG. 3 is a diagram showing operation steps prior to performing insulation measurement.

EXPLANATION OF REFERENCE NUMERALS

1 . . . Shinkansen bullet train, 2 . . . vehicle, 3 . . . power distribution box, 4 . . . relay unit, 5 . . . GS unit, 5A . . . ground-side switch, 6 . . . breaker unit, 7 . . . contactor unit, 8 . . . contactor, 8A . . . solenoid, 9 . . . external power supply connection portion, 10 . . . external power supply unit, 10A . . . non-connector portion, 10C . . . third switch, 11 . . . first switch, 12 . . . second switch, 13 . . . indicator light

MODE FOR CARRYING OUT THE INVENTION

A present embodiment is an example in which the present invention is applied to a Shinkansen bullet train. A member or a portion explained at least with a numeral assigned thereto is at least one in number except in the presence of an express description such as "a plurality of" and "two or more".

Embodiment

1. Ground Line Opening Circuit, Etc., for Railway Vehicle

Figure 1A:
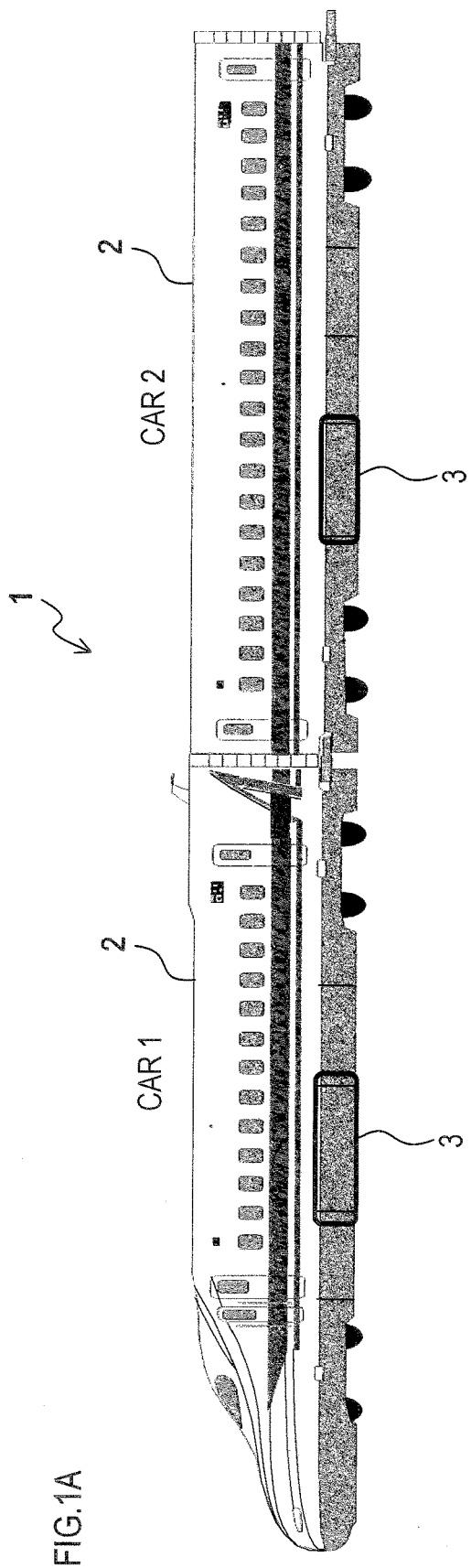
FIG. 1A is a schematic diagram of railway vehicles.
Figure 1B:
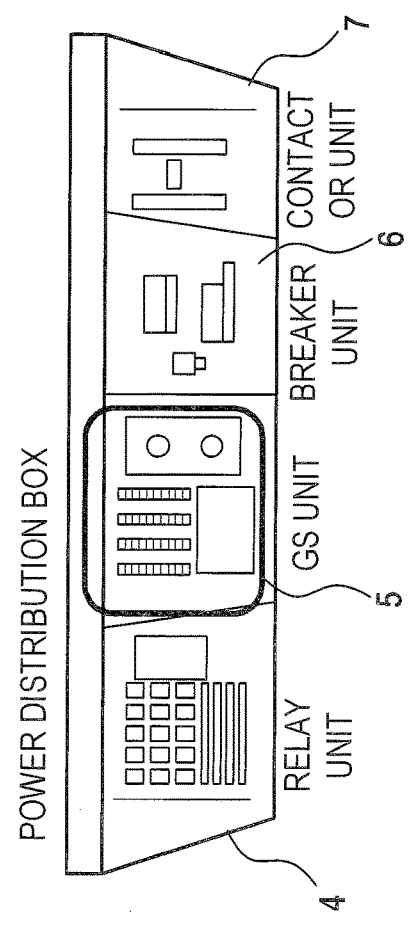
FIG. 1B is a schematic diagram showing a power distribution box in its opened state.

As shown in FIG. 1A, a Shinkansen bullet train 1 having a plurality of vehicles coupled together has a power distribution box (SBB) 3 provided to each vehicle 2. Each power distribution box 3 is provided to a side part of a lower side of the vehicle. As shown in FIG. 1B, these power distribution boxes 3 are each provided with a relay unit 4, a ground switch unit (hereinafter referred to as a GS unit) 5, a breaker unit 6, contactor unit 7, and so on.

The relay unit 4 is provided with a plurality of relays that protect a plurality of electrical circuits (electrical devices) provided to the vehicle 2. The breaker unit 6 is provided with a plurality of breakers that interrupt a conduction current to each vehicle.

The contactor unit 7 is provided with a plurality of contactors that control opening/closing of the above-described electrical circuits and so on. The GS unit 5 is provided with a plurality of ground-side switches 5A that open and close circuits leading from the respective electrical circuits to a ground.

Figure 2:
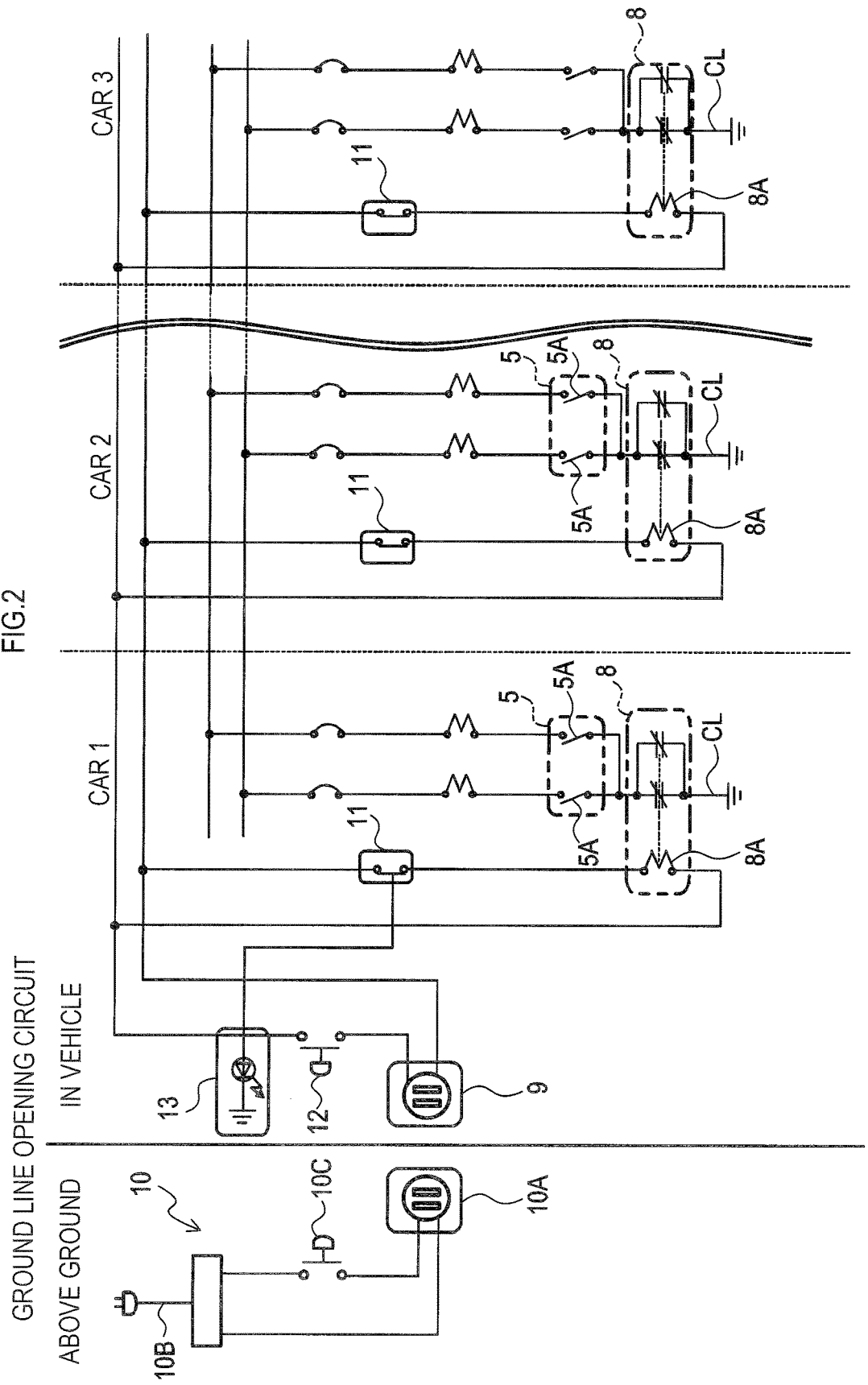
FIG. 2 is an explanatory diagram of a ground line opening circuit.

As shown in FIG. 2, a ground side of each ground-side switch 5A is connected to the ground via a common line CL. The common line CL is provided with a contactor 8 that opens and closes the common line CL. That is, in the present embodiment, every electrical circuit provided to each vehicle is opened from the ground when the at least one contactor 8 provided to each vehicle is opened.

The contactor 8 is a normally closed type contactor that opens the common line CL by receiving supply of electric power through an external power supply connection portion 9 and that closes the common line CL when no current is applied, i.e., when not receiving supply of electric power through the external power supply connection portion 9. The contactor 8 according to the present embodiment is provided to the GS unit 5.

In the contactor 8, when no current is applied, a state in which a contact is closed by a spring (not shown) provided to the contactor 8 is maintained, whereas when a current is applied, the contact is opened by a solenoid 8A provided to the contactor 8. Thus, when the current supply to the contactor 8 is stopped, the common line CL is closed by the above-described spring.

The external power supply connection portion 9 is a connector portion for coupling of an external power supply unit 10. The external power supply unit 10 is provided with: a non-connector portion 10A, to which the external power supply connection portion 9 can be coupled; a connector portion 10B for coupling of the external power supply unit 10 to a commercial power supply; and so on.

Each circuit leading from the external power supply connection portion 9 to each solenoid 8A is provided with a first switch 11 that opens and closes the circuit. The first switch 11 is a switch to operate in conjunction with a vehicle power supply switch. The first switch 11 is configured to open when the vehicle power supply switch has been turned on (when it is "ON") and to close when the vehicle power supply switch has been turned off (when it is "OFF").

Specifically, the first switch 11 determines whether supply of electric power to the plurality of electrical circuits is stopped and, if such supply of electric power is not stopped, the first switch 11 operates as one example of an operation prohibition determining unit that prohibits the contactor 8 from opening the common line CL.

Provided to at least one of a lead vehicle or a rearmost vehicle is a second switch 12 that opens and closes a circuit that supplies electric power to each solenoid 8A. The second switch 12 is a manual switch to be operated directly by an operator.

In the present embodiment, also provided to the external power supply unit 10 is a third switch 10C that opens and closes a circuit leading to the external power supply connection portion 9. The third switch 10C is also a manual switch to be operated directly by the operator.

In the present embodiment, only when both the second switch 12 and the third switch 10C are closed by the operator and the supply of electric power to the plurality of electrical circuits is stopped, a current is supplied to the solenoid 8A to open the common line CL.

2. Operation Steps Prior to Performing Insulation Measurement

FIG. 3 is one example of an operation procedure flow showing operation steps to be carried out by the operator prior to performing insulation measurement.

When performing the insulation measurement, the operator first turns off the vehicle power supply switch (S1). Next, the operator couples the external power supply connection portion 9 to the external power supply unit 10, as well as couples the external power supply unit 10 to the commercial power supply (S2).

Subsequently, the operator confirms that the above-described couplings have been completed, and then operates the second switch 12 and the third switch 10C to close the circuits (S3). This causes a current to be supplied to the solenoid 8A to open the common line CL (S4).

3. Features of Ground Line Opening Circuit, Etc., for Railway Vehicle According to the Present Embodiment In the present embodiment, (1) when the contactor 8 provided to each vehicle is opened, all of the plurality of electrical circuits provided to the vehicle go into a state not connected to the ground. Accordingly, it can be inhibited that the insulation measurement is performed with the electrical circuits connected to the ground.

(2) The contactor 8 is of a normally closed type. Thus, when the external power supply unit 10 is detached from the external power supply connection portion 9, the contactor 8 is closed concurrently. Accordingly, it can be inhibited that the insulation measurement is terminated with all of the plurality of electrical circuits in a state not connected to the ground.

(3) For example, if the contactor 8 is of a normally opened type, when the current supply to the contactor 8 is stopped while the train is running, all of the plurality of electrical circuits go into a state not connected to the ground. In such a case, a malfunction may occur, such as stopping of devices operated by the electrical circuits. In contrast, the contactor 8 according to the present embodiment is of a normally closed type, and thus, occurrence of the malfunction as described above can be inhibited.

(4) When the supply of electric power to the plurality of electrical circuits is not stopped, the contactor 8 is not opened. Thus, the contactor 8 is not required to have a current interruption function. Accordingly, it is unnecessary to use a breaker as the contactor 8, whereby size reduction of the contactor 8 can be promoted.

(5) The second switch 12, which opens and closes a current-carrying circuit to the contactor 8, is operated by the operator. Thus, even when the first switch 11 malfunctions due to any fault, an operation error can be inhibited.

For this purpose, in the present embodiment, an indicator light 13, which is turned on or off in accordance with an open/closed state of the first switch 11, is provided in the vicinity of the second switch 12 as shown in FIG. 2. This enables the operator to visually confirm the open/closed state of the first switch 11 easily via the indicator light 13 when operating the second switch 12.

"The vicinity of the second switch 12" means, for example, an area where the operator can visually observe the indicator light 13 without a significant eye movement when operating the second switch 12. Specifically, "the vicinity of the second switch 12" is, for example, an area within a radius of 50 cm from the second switch 12.

Other Embodiment

In the above-described embodiment, the present invention is applied to the Shinkansen bullet train. However, application of the present invention is not limited to this, and the present invention can also be applied to other railway vehicles.

In the above-described embodiment, the contactor 8 is provided to the GS unit 5. However, the present invention is not limited to this, and the contactor 8 may be provided to a different portion.

In the above-described embodiment, the second switch 12 and the third switch 10C are provided. However, the present invention is not limited to this, and, for example, it is possible not to provide one of the switches.

In the above-described embodiment, the second switch 12 is provided to the lead vehicle or the rearmost vehicle. However, the present invention is not limited to this.

In the above-described embodiment, operation of the first switch 11, which is one example of the operation prohibition determining unit, is achieved by hardware. However, the present invention is not limited to this, and the operation of the operation prohibition determining unit may be achieved by software.

Further, the present invention has only to conform to the spirit of the invention set forth in the claims, and is not limited to the above-described embodiment.

The invention claimed is:

1. A railway vehicle comprising a plurality of electrical circuits, the railway vehicle comprising:
   an external power supply connection portion for coupling to an external power supply;
   a contactor of a normally closed structure that opens and closes a common line connecting the plurality of electrical circuits to a ground, wherein the contactor is open when the contactor receives supply of electric power from the external power supply connection portion and the contactor is closed when no current is applied;
   a solenoid electrically coupled to the contactor; and
   a first switch that is configured to operate in response to a condition of a power supply of electric power from a vehicle power supply to the plurality of circuits and to interrupt application of current to the solenoid so as to prohibit the contactor from being opened when the supply of electric power from said vehicle power supply to said plurality of electrical circuits is not stopped.

2. The railway vehicle according to claim 1, comprising a second switch that opens and closes a current-carrying circuit to the contactor and that is operated by an operator.

3. The railway vehicle according to claim 2, wherein the second switch is provided to at least one of a lead vehicle or a rearmost vehicle.

4. The railway vehicle according to claim 1, comprising a plurality of ground-side switches that are each provided to a corresponding circuit leading from the plurality of electrical circuits to the common line and that each open and close the corresponding circuit.

* * * * *